J. NOURSE & J. A. HOWE.
Swivel-Plow.
No. 216,443. Patented June 10, 1879.
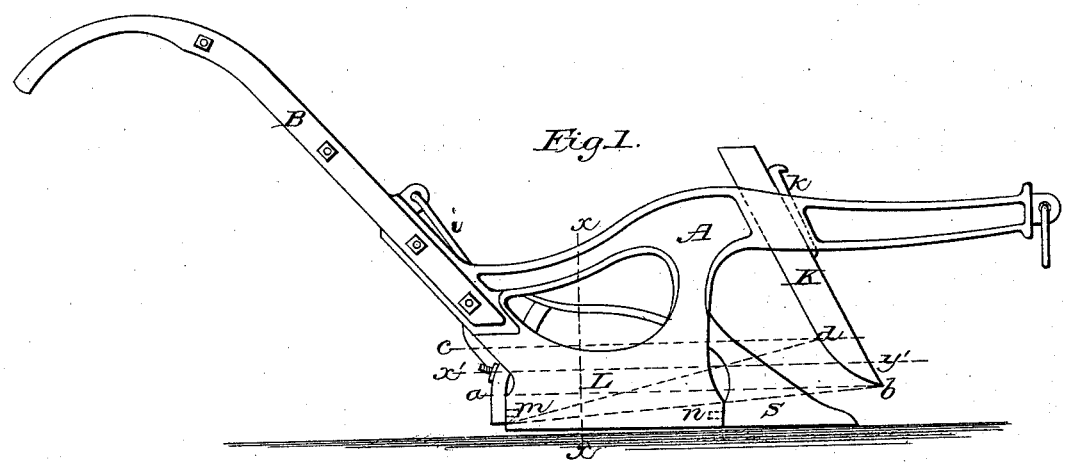
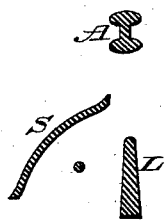
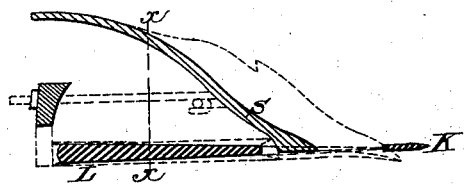
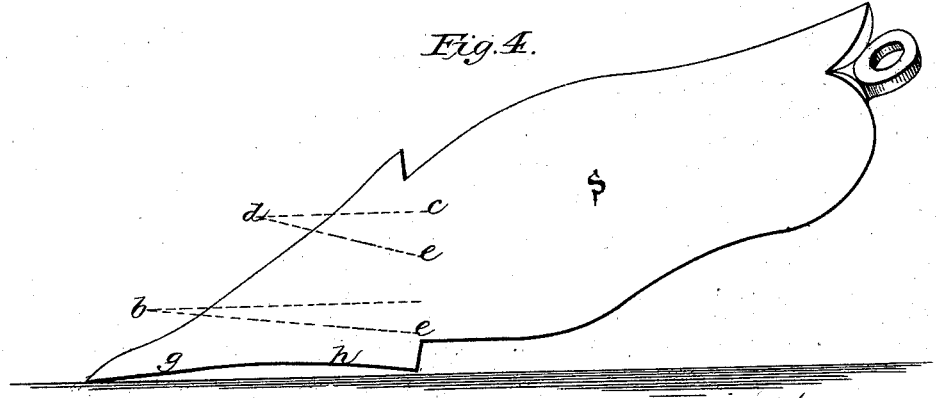
Witnesses:
Edwin A. Hildreth.
Y. C. Severy
Inventors:
Joel Nourse
James A. Howe

UNITED STATES PATENT OFFICE.

JOEL NOURSE, OF BOSTON, AND JAMES A. HOWE, OF AYER, MASS.

IMPROVEMENT IN SWIVEL-PLOWS.

Specification forming part of Letters Patent No. 216,443, dated June 10, 1879; application filed June 24, 1878.

*To all whom it may concern:*

Be it known that we, JOEL NOURSE, of Boston, in the county of Suffolk and State of Massachusetts, and JAMES A. HOWE, of Ayer, in the county of Middlesex and State of Massachusetts, have jointly invented a new and useful Improvement in Swivel-Plows, of which the following is a specification.

This invention relates to that class of plows known as "swivel-plows."

The nature of this invention consists in so constructing the land-side and point of a swivel-plow that whichever way the mold-board may be turned the whole face of the land-side shall be formed on a series of straight and parallel lines all passing through the center of a stationary cutter.

Heretofore it has been customary in swivel-plows to have a movable cutter to be thrown from side to side as the plow is reversed, to bring the cutter into line with the faces of the land-side first on one side and then on the other to make the plow take sufficient land.

One of the objects of our invention is to avoid a movable colter, and construct the land-side in swivel-plows so that for the full depth of the furrow it shall present a working-surface to the unplowed land, and shall line the plow properly with a stationary cutter.

In the accompanying drawings, in which similar letters of reference indicate like parts, Figure 1 is a side elevation, showing the land-side of a swivel-plow embodying our invention. Fig. 2 is a vertical transverse section through the plane $x\,y$. Fig. 3 is a horizontal longitudinal section through the line $x'\,y'$. Fig. 4 shows the furrow-side of our mold-board, on an enlarged scale, to show the shape of the base or land-side of the share.

The beam or main frame of the plow A is made of cast or wrought iron, or wood, as may be desired. The beam A is provided with a recess to hold the knife or cutter K, which is held in position by the key $k$. The handles B are bolted to the beam or main frame in the usual manner.

The mold-board S is pivoted to the land-side or main frame L by the pivots $m$ and $n$ in front and rear, and is held in position on either side of the plow by the hook $i$, which fastens into the loop in the mold-board. (Shown in Fig. 4.)

In constructing our plow, we first place the stationary cutter K in its proper position in the center of the beam, where it should be fastened securely. We construct the frame L of the plow with a face on each side to be used as land-sides, each face being a plane surface to act as a land-side as high as the furrow reaches. The line $c\,d$ is the extreme height to which the furrow is intended to reach for the deepest plowing. The land-side on the frame L on both sides of the plow is formed to fit a straight line, $c\,d$, said line passing through the center of the stationary cutter-knife. The line $a\,b$ passes through the point of the knife at the lowest point to which the knife is intended to be set. The line $a\,b$ is parallel to the line $c\,d$ and with the ground, and the land-side is also formed to fit the line $a\,b$ along its face.

We also construct the land-side portion of the frame L on both sides of the plow between the lines $c\,d$ and $a\,b$, so that any straight line parallel with the ground and passing from the rear edge of the land-side frame to the center of the cutter will fit along the face of the land-side frame.

We also cut away both land-side faces of the point or share of our swivel-plow until the lines $c\,d$ and $a\,b$ pass along its land-side face whichever side the land-side may be turned.

We also cut away the land-side faces of our share between these lines until all the parallel lines between the lines $c\,d$ and $a\,b$, passing along the face of the land-side L and through the center of the cutter, also pass along the face or land-side of the share. This will, if the knife be straight, make the land-side of the share straight between the lines $c\,d$ and $a\,b$, as shown by the straight line from $g$ to $h$. (Shown in Fig. 4.)

By cutting away the central portion of the two faces of the share into a plane with the face L and cutter K, leaving the point lower on both sides of this portion of the share, we produce a share which will cling to the ground when the point of the share has been rounded off by wear and the land-side lines true with the cutter whichever way the plow is turned.

If the land-side of the frame and share should be cut away toward the forward portion even more than we have done, so as to throw the knife somewhat onto the land-side of the lines lying horizontally along the face of the land-side, it will readily be seen that the result will still be substantially the same as we have accomplished, because our object is to make the plow take sufficient land, and if the land-side of the share were cut away even more than we have done the same result might be accomplished, even in a greater degree.

The straight lines $e\,d$ and $e\,b$, passing from the heel of the plow to the knife, will also rest on the edge of the share, and all straight lines between said lines, passing from the heel of the plow to the cutter, will also rest on the edge of the share. Thus the knife is made to line true with the face of the land-side through the entire cut of the knife, whether lined from the heel or by horizontal lines.

In our improved swivel-plow we now place the colter in the center of the beam rigid and firm, and then build the land-side of the plow to it, so as to line true with the center of the stationary cutter.

It has been common heretofore to first make the plow and then try to fit the colter to it, and because it could not be done in this way the reversible colter was adopted.

Swivel-plows may possibly have been constructed the land-sides of which approach nearly to a line with the side of their colter farthest from the plowed land passing within, say, one-fourth to one-half inch from the side at a single point, as at the surface-line of the cut; but we are not aware that any parties have hitherto constructed their land-sides in swivel-plows so that from the surface-line to the point of the colter a true alignment is maintained.

In some former swivel-plows they have attempted to line a single point on the knife by thickening the heel of the plow; but never, so far as we know, have they before been able, in a swivel-plow, to make the knife-line true with the land-side through the entire cut of the knife.

By the construction of our land-side in a simple plane surface vertically we are enabled to present a working and controlling land-side of our swivel-plow to the unplowed land for the full depth of the furrow on either side of the plow whichever way the mold-board may be turned.

Having thus described the nature and operation of our improved swivel-plow, what we claim as new, and desire to secure by Letters Patent, is—

1. The land-sides of the frame and share in a swivel-plow, constructed substantially as described, so that the parallel lines $c\,d\,a\,b$ and all the parallel lines between them resting on the land-side of the plow at both rear and front edges shall all pass through the stationary cutter or on the mold-board side of the same, whichever way the plow may be turned.

2. The land-sides of the frame and share in a swivel-plow, constructed substantially as described, so that any straight line resting on the heel of the plow at $e$, and passing through the stationary cutter at any point between $d$ and $b$, shall fit against the edge of the land-side of the share, or leave said edge on the mold-board side of said lines, substantially as and for the purpose set forth.

JOEL NOURSE.
JAMES A. HOWE.

Witnesses:
EDWIN A. HILDRETH,
G. C. STEVENS.